No. 773,118. PATENTED OCT. 25, 1904.
W. W. CARTER.
SAW FOR SAWING MACHINES.
APPLICATION FILED NOV. 21, 1903.
NO MODEL.
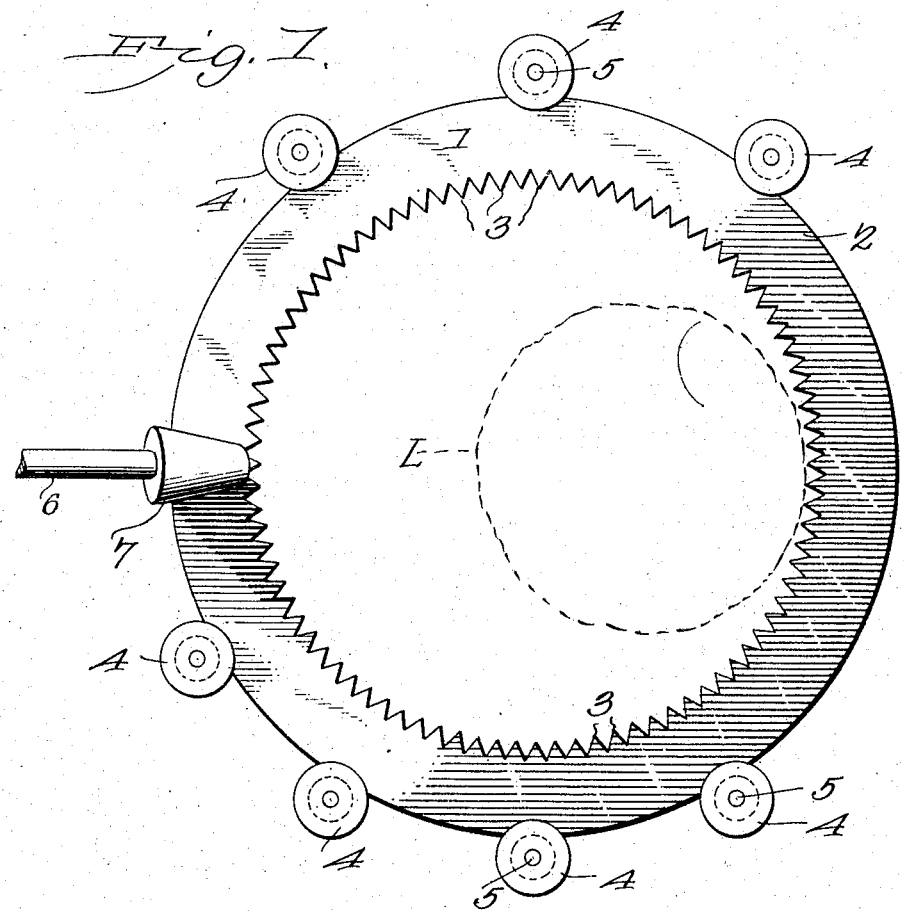
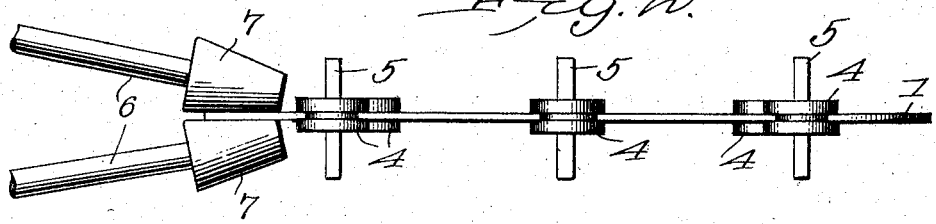
Witnesses
William W. Carter,
Inventor.
by
Attorneys No. 773,118.  
Patented October 25, 1904.

UNITED STATES PATENT OFFICE.

WILLIAM WELZE CARTER, OF BALLARD, WASHINGTON.

SAW FOR SAWING-MACHINES.

SPECIFICATION forming part of Letters Patent No. 773,118, dated October 25, 1904.

Application filed November 21, 1903. Serial No. 182,184. (No model.)

*To all whom it may concern:*

Be it known that I, WILLIAM WELZE CARTER, a citizen of the United States, residing at Ballard, in the county of King and State of Washington, have invented a new and useful Saw for Sawing-Machines, of which the following is a specification.

This invention relates to saws for sawing-machines; and the principal object of the invention is to provide a simple and effective substitute for a drag-saw.

With the object above mentioned in view the invention consists in a circular saw of large size having the central portion cut out to leave an annulus which has saw-teeth formed at the inner margin thereof.

In describing the invention reference will be had to the accompanying drawings, in which are illustrated the preferred form of saw, the means for supporting the saw, and the means for imparting movement to the saw.

In the drawings, Figure 1 is a view in side elevation of the saw, the saw-supporting devices, and the driving mechanism, a log being shown in position for the saw to operate thereon. Fig. 2 is a plan view of the parts shown in Fig. 1.

Referring to the drawings by reference characters, 1 designates the saw, which, as above stated, is in the form of an annulus and is preferably of large diameter. The width of the annulus will be varied according to the diameter and the character of the work to be performed, so as to insure sufficient strength. The outer margin 2 of the saw is smooth, and the inner margin is provided with teeth 3, which may be of any preferred form and may be formed integral with the body of the saw or detachably secured in position by means of any preferred form of toothed fastening means.

The saw is supported and guided by a plurality of circumferentially-grooved rolls 4, mounted upon suitable shafts 5, which will be supported by a framework of any preferred design, which has been omitted, as it forms no part of the present invention. In the arrangement of the grooved rolls 4 the greater number will be provided below the saw 1 to sustain the weight thereof, and a sufficient number will be arranged above the saw to insure its proper guidance. At one side of the saw no rolls will be provided, because in the operation of the saw the saw engages at that side with the log L, and supporting-rolls placed at that side of the saw would, therefore, be in the way and prevent the successful operation of the saw. At the side of the saw opposite that which engages with the log the driving mechanism, consisting, preferably, of a pair of parallel shafts 6, each bearing a friction-roller 7, which is in contact with one face of the saw, is supported in any suitable manner, and any convenient form of mechanism (not shown) will be employed in transmitting motion to the shafts 6.

The frame in which the saw and its supporting and driving mechanism are mounted will preferably be arranged so as to be readily movable and form a carriage for reciprocatory movement on the ground or a bed of suitable design.

When in operation the carriage supporting the saw and the driving mechanism will be moved from right to left, as shown in the drawings, and will so bring the saw into engagement with the log and cause the feeding of the saw at a suitable rate, the log being held stationary and supported at such height above the ground as to facilitate the operation of the saw.

It will readily be seen from the foregoing description and the drawings illustrative thereof that with a saw constructed in the manner described it will be easy to cut through logs of large size, provided the logs are not too large to pass through the central opening in the saw. The machine will be much smaller, lighter, and more easily operated than a circular saw of the ordinary type which is large enough to cut through logs of the size which may be severed by means of a machine constructed in accord with this invention, and the continuous action of the improved saw will insure more rapid work at less expenditure of power than is possible with a drag-saw in which a reciprocating movement must be imparted to the saw.

A special feature of advantage over a drag-saw which will be noted in the present invention is that its continuous travel will prevent the sudden strains to which a drag-saw is subjected at the beginning of each reciprocatory movement. Consequently the improved saw is not apt to be distorted, and its action will be satisfactory as long as the teeth are kept sharp.

While I have described and shown the preferred form of embodiment of the invention, it will be obvious that various changes in the character and form of the supporting and driving devices may be made without departing from the spirit of the invention, and I do not desire to be limited to the exact form of apparatus shown and described.

Having thus described the construction and operation of my invention, what I claim as new, and desire to secure by Letters Patent, is—

The combination with a saw consisting of an annulus of suitable width and thickness and having the teeth formed along its inner margin, of two sets of supporting and guiding rolls, said sets of rolls being arranged above and below the saw respectively and being spaced farther apart at one side of the saw than the other, and suitable driving devices arranged to engage the saw upon the side where the two sets of supporting and guiding rolls are closer together.

In testimony that I claim the foregoing as my own I have hereto affixed my signature in the presence of two witnesses.

WILLIAM WELZE CARTER.

Witnesses:
W. THAAMUN,
C. W. CASLER.